United States Patent

Mohri

[15] 3,702,621
[45] Nov. 14, 1972

[54] HYDRAULIC SERVO VALVE
[72] Inventor: Yohichi Mohri, Yokohama, Japan
[73] Assignee: Nissan Motor Company, Limited, Yokohama City, Japan
[22] Filed: Jan. 26, 1971
[21] Appl. No.: 109,792

[30] Foreign Application Priority Data
Feb. 3, 1970   Japan .......................... 45/9104

[52] U.S. Cl. ................................................. 137/85
[51] Int. Cl. ................................................. F15b 5/00
[58] Field of Search ........................... 137/85, 625.65

[56] References Cited
UNITED STATES PATENTS 3,260,273   7/1966   Hayner ......................... 137/85
3,455,319   7/1969   Hogel ........................... 137/85
3,587,617   6/1971   Olsen ............................ 137/85
3,592,211   7/1971   Spalding ........................ 137/85
3,129,563   4/1964   Long ........................... 137/85 X
3,239,141   3/1966   Best ............................ 137/85 X

*Primary Examiner*—Alan Cohan
*Attorney*—John Lezdey

[57] ABSTRACT

A hydraulic servo valve for varying a fluid pressure, which servo valve comprises a control valve and an actuator, the control valve including a valve spool associated with the actuator to produce a reduced pressure and a feedback piston responsive to the reduced pressure to control the movement of said valve spool for thereby varying the fluid pressure.

10 Claims, 6 Drawing Figures

3,702,621

HYDRAULIC SERVO VALVE

This invention relates to a hydraulic servo valve and, more particularly, to a hydraulic servo valve for electrically controlling a fluid pressure.

The hydraulic servo valve proposed by this invention is specifically suited for use with a hydraulic control system for an automotive automatic power transmission. The hydraulic control system usually includes a regulator valve for regulating a line pressure to an optimum level to effect smooth shifting between a plurality of gear ratios. To provide an appropriate line pressure, the regulator valve is adapted to be responsive to a control pressure which is produced in accordance with the variation in magnitude of an electric signal representing the operating conditions of an engine or driving conditions of a motor vehicle, such conditions may include an engine speed, an intake manifold vacuum of the engine, a vehicle speed or an output torque of a torque converter. It is in this instance desirable to accurately vary the control pressure supplied to the regulator valve in strict accordance with the electric signal. Various devices have therefore been proposed with a view to having available a control pressure accurately representing various varying operational conditions. These conventional devices have a difficulty not only in accurately varying the control pressure in accordance with the operational variables but in providing a simple construction of the servo valve.

It is, therefore, an object of this invention to provide a hydraulic servo valve adapted to accurately vary control pressure in accordance with an electric signal produced as a function of given operational variables.

Another object of this invention is to provide a hydraulic servo valve which is simple in construction and inexpensive to manufacture.

Figure 1:
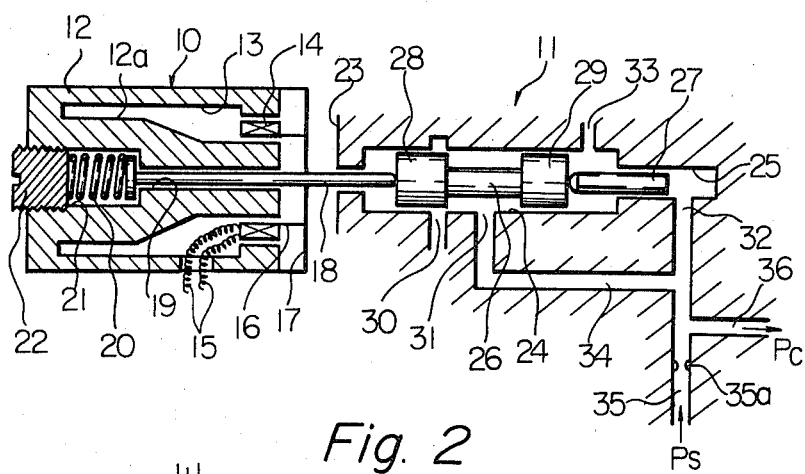
FIG. 1 is a sectional view of a hydraulic servo valve embodying this invention.

Referring now to FIG. 1, the hydraulic servo valve implementing this invention comprises an actuator 10 for controlling the hydraulic servo valve, and a control valve 11 interposed in a hydraulic circuit and controlled by the actuator 10 for varying a fluid pressure supplied to the control valve 11 thereby to produce a control pressure. The control pressure is supplied to a suitable device such as for example a regulator valve of a hydraulic control system for an automotive automatic power transmission.

The actuator 10 includes a casing 12 having a bore 13 formed therein, and a moving coil 14 connected to conductors 15. The casing 12 is made of a magnetic material to permit the moving coil 14 to move back and forth in the bore 13 of the casing 12 when the coil 14 is energized and de-energized. The moving coil 14 is mounted on a support member 16 which is operatively connected to a diaphragm member 17. The diaphragm member 17 is positioned on the casing 12 for closing an open end of the casing for dust-proofing purposes.

The casing 12 has formed in its bore 13 a guide member 12a which is integral with the casing 12. The guide member 12a extends from the closed end of the casing and terminated adjacent the open end thereof. A plunger 18 is connected to the diaphragm member 17 and slidably received in a passage 19 extending internally of the guide member 12a. The plunger 18 is biased outwardly by a spring 20 which is disposed in a bore 21 formed in the casing 12. An adjusting screw 22 is provided for adjusting the force of the spring 20 thereby to vary the force exerted to the plunger 18.

The actuator 10 is so constructed that the moving coil 14 and accordingly the plunger 18 are axially moved inwardly or outwardly of the casing 12, when the coil 14 is energized, the amount of such movement corresponding to the intensity of an electric current supplied to the coil 14. The plunger 18 is associated with the control valve 11 for providing the control pressure.

The control valve 11 includes a valve body 23 which is provided with a control chamber 24 and a feedback chamber 25. The control valve 11 also includes a valve spool 26 and a feedback piston 27 which are slidably accommodated in the control chamber 24 and the feedback chamber 25, respectively. The valve spool 26 has spaced lands 28 and 29 of the same diameter. The land 28 cooperates with the plunger 28 of the actuator 10 while the land 29 cooperates with the feedback piston 27. The feedback piston 27 and the valve spool 26 are axially aligned with each other and are movable together.

The valve body 23 has a plurality of ports 30, 31, 32 and 33. The port 30 is a drain port from which an excess of fluid is drained off to provide a resultant decrease of fluid pressure in the control chamber 24. The port 31 communicates with the port 32 through a feedback passage 34 for feeding the decreased pressure back to the feedback chamber 25 whereby the feedback piston 27 is caused to act on the land 29 of the valve spool 26 to move the same against the opposing force acting on the land 28 for thereby producing the control pressure. The port 33 may be vented to the atmosphere for sliding movements of the valve spool 26 and the feedback piston 27.

A fluid pressure supply passage 35, which has an orifice 35a therein, communicates through the feedback passage 34 with the port 31 to supply the control chamber 24 with the fluid pressure. A control pressure delivery passage 36 communicates with the passage 34 for delivering the control pressure to the suitable device such as regulator valve (not shown).

It may be noted for the better understanding of this invention that the valve spool 26 is initially moved by the action of the plunger 18 of the actuator 10 to vary the degree of communication between the ports 30 and 31 for thereby producing a reduced pressure in the control chamber 24 and subsequently moved by the action of the feedback piston 27 in response to the reduced pressure delivered to the feedback chamber 25 for determining the degree of communication between the ports 30 and 31 thereby to produce the control pressure in the control chamber 24.

To facilitate the understanding of the operation of the hydraulic servo valve embodying this invention, let it be assumed that the force of the spring 20 is decreased by adjusting the screw 22 and the plunger 18 is moved outwardly by the action of the moving coil 14 when it is energized. Let it be further assumed that the fluid pressure is supplied through the passage 35 to the control chamber 24 of the control valve 11.

When the actuator 10 is energized, then the moving coil 14 and accordingly the plunger 18 are moved outwardly under the influence of the magnetic field in the casing 12. In this instance, the valve spool 26 is moved outwardly to close the port 30, thereby producing the reduced fluid pressure in the control chamber 24. The thus reduced fluid pressure is then fed through the passage 34 back to the port 32 leading to the feedback chamber 25. The pressure in the feedback chamber 25 acts on the end of the feedback piston 27. Consequently, the feedback piston 27 is caused to protrude so as to move the valve spool 26 in the same direction against the force acting on the land 28 of the valve spool 26. The valve spool 26 then assumes the position where the force acting on the land 27 balances with the force acting on the land 28, and thus a control pressure is produced in the control chamber 24. The control pressure thus obtained is supplied to a suitable device (not shown) to be controlled.

As the electric current energizing the moving coil 14 is increased, the force exerted to the plunger 18 and accordingly to the land 28 of the valve spool 26 increases, so that the valve spool 26 is moved toward the actuator 10 against the force acting on the land 29. Since, in this instance, the degree of communication between the ports 30 and 31 decreases, the control pressure is accordingly increased.

Figure 2:
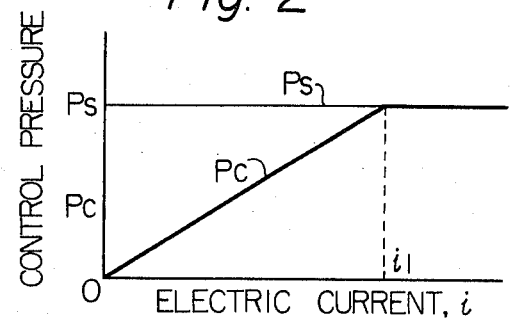
FIGS. 2 and 3 are graphic representations of the control pressure which is obtained by the hydraulic servo valve shown in FIG. 1.

When, however, the electric current is further increased beyond a predetermined value $i$, the port 30 is closed by the land 28 associated with the plunger 18, so that the control pressure $P_c$ becomes equal to the supplied fluid pressure $P_s$. Thus, the control pressure $P_c$ remains constant when the electric current reaches the predetermined value, as illustrated in the graph of FIG. 2.

When, on the contrary, the electric current energizing the moving coil 14 is decreased, the force acting on the land 28 becomes smaller than that acting on the land 29 of the valve spool 26, so that the valve spool 26 is moved toward the actuator 10 to increase the degree of communication between the ports 30 and 31 for thereby decreasing the control pressure obtaining the control chamber 24.

Figure 3:
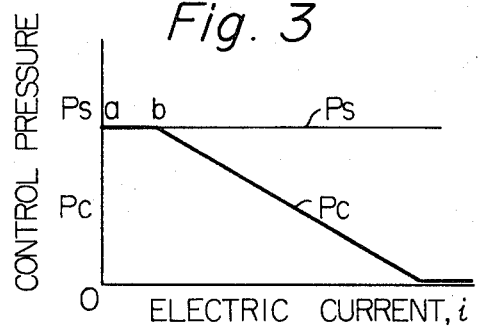

When it is desired to decrease the control pressure while increasing the electric current supplied to the moving coil 14, the force of the spring 20 is made larger than that acting on the feedback piston 27 by adjusting the screw 22, and the electric current is applied to the moving coil 14 so as to cause the coil 14 to move inwardly of the casing 12 against the force of the spring 20. In this instance, the control pressure varies in a manner illustrated in the graph of FIG. 3. In the absence the electric current to be supplied to the moving coil 14 as indicated at point $a$, the plunger 18 is moved by the force of the spring 20, thereby causing the valve spool 26 to close the port 30, and thus the control pressure $P_c$ becomes equal to the supplied pressure $P_s$. As the electric current is increased to a value corresponding to point $b$ in FIG. 3, the magnetic force exerted to the moving coil 14 and the force exerted to the feedback piston 27 balance with the force of the spring 20. As the electric current is further increased to increase the magnetic force exerted to the moving coil 14, the degree of communication between the ports 30 and 31 increases, thereby decreasing the control pressure $P_c$. In this instance, the force exerted to the feedback piston 27 is accordingly decreased but the valve spool may assume the position where the forces exerted to the feedback piston 27 and the plunger 18 balance with the force of the spring 20. Thus, the control pressure $P_c$ decreases linearly as the electric current increases, and becomes zero when the electric current reaches the value corresponding to point $c$ in FIG. 3. When the electric current increases beyond the value corresponding to point $c$, the port 30 is kept open so that the control pressure is absent in the control chamber 24.

Figure 4:
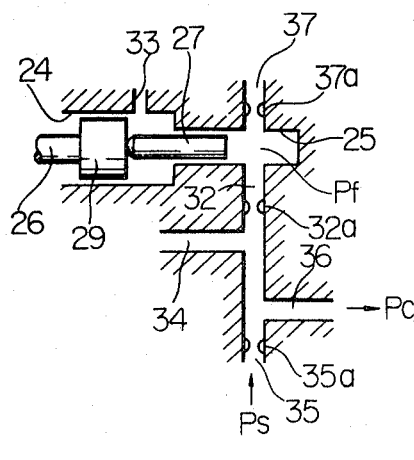
FIG. 4 is a sectional view of a modified form of the hydraulic servo valve.

The feedback piston 27 must be so constructed as to have a smaller diameter where it is desired to make available the control pressure of a higher level. It is, however, difficult to a fabricate such small feedback piston with satisfactory precision. To solve this problem, means are provided whereby the reduced pressure to be applied to the end of the feedback piston 27 is rendered lower than the control pressure for thereby obviating the necessity of providing the feedback piston of the small diameter. A modified form of the hydraulic servo valve having such means is partially illustrated in FIG. 4 wherein parts in FIG. 1 corresponding to those are designated by like numerals. As shown in FIG. 4, the port 32 is provided with an orifice 35a and the feedback chamber 25 is adapted to communicate with an exhaust passage 37 having an orifice 37a whereby the reduced pressure to be delivered to the feedback chamber 25 is passed into the exhaust passage 37 to decrease the fluid pressure $P_f$ acting on the feedback piston 27. In this instance, the fluid pressure $P_f$ is lower than the control pressure $P_c$ to be supplied to the control chamber 24 with the fluid pressure $P_f$ varying in proportion to the variation in the control pressure $P_c$. Thus, the size of the feedback piston 27 is determined by appropriately selecting the effective sectional areas of the orifices 32a and 37a for thereby facilitating the machining of the feedback piston.

Figure 5:
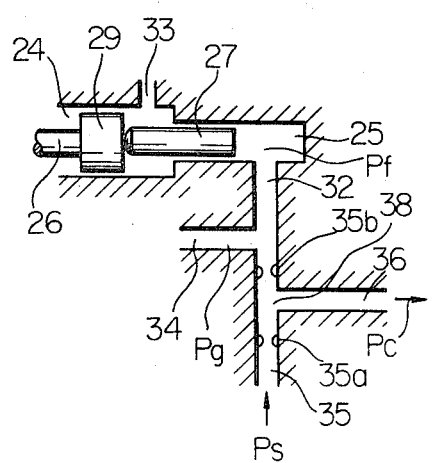
FIG. 5 is a sectional view of another modified form of the hydraulic servo valve.

Another modified form of the hydraulic servo valve is schematically illustrated in FIG. 5, wherein parts corresponding to those in FIG. 1 are similarly numbered. This embodiment differs from the first embodiment in that an orifice 35b is provided in the fluid pressure supply passage 35 and that the control pressure delivery passage 36 intersects the fluid pressure supply passage 35 at a point 38 between the orifices 35a and 35b for thereby varying the control pressure in accordance with two given variables. An output torque of the engine and the rotational speed of the torque converter are utilized as the operational variables where the hydraulic servo valve of this type is used in the hydraulic control system of the automotive automatic power transmission. The output torque of the engine is converted into a pressure signal by means of a suitable modulator valve (not shown) which may be actuated by the vacuums in the intake manifold or the engine. The signal thus obtained is applied to the supply pressure $P_s$. The rotational speed of the torque converter, on the other hand, is converted into an electric signal which is applied to the moving coil 14 (see FIG. 1). Thus, the control pressure $P_c$ is varied in accordance with the variation in the two operational variables.

Figure 6:
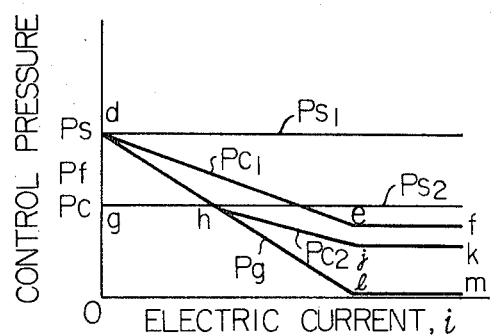
FIG. 6 is a graphic representation of the control pressure which is obtained by the hydraulic servo valve shown in FIG. 5.

FIG. 6 graphically illustrates the examples of the variations in the control pressure which is obtained by the use of the hydraulic servo valve of FIG. 5. When the supplied pressure $P_s$ is at a sufficiently high level, the reduced pressure $P_o$ in the passage 34 is linearly varied in relation to the intensity of electric current $i$, following the curve $d$–$l$–$m$ in FIG. 6, in a manner previously discussed. Since, in this instance, the control pressure delivery passage 36 intersects the fluid pressure supply passage 35 at the point 38 between the orifices 35$a$ and 35$b$, the control pressure $P_c$ in the passage 36 is varied in a range between the fluid pressures $P_s$ and $P_o$ and assumes a value which is determined by the flow resistances of the orifices 35$a$ and 35$b$. If the supplied pressure $P_s$ is at a sufficiently high level as shown by $P_{s1}$ in FIG. 6, the control pressure $P_c$ varies in a manner as shown by curve $d$– $e$–$f$. As the supplied pressure $P_s$ decreases down to the level of $P_{s2}$, the pressure $P_o$ varies following the curve $g$–$h$ when the electric current $i$ is small, and also varies following the curve $h$–$j$–$k$ once the electric current has reached a predetermined value. Thus, the control pressure $P_c$ is determined by the supplied pressure $P_s$ and the electric current $i$.

It will now be understood that the hydraulic servo valve embodying this invention is advantageously controlled by the actuator and feedback piston associated therewith whereby the control pressure is varied in strict accordance with the variation in the electric current with which the actuator is energized.

What is claimed is:

1. A hydraulic servo valve for varying a fluid pressure comprising, in combination, a valve body, a control chamber formed in said valve body, a feedback chamber formed in said valve body, a feedback passage formed in said valve body and providing communication between said control chamber and said feedback chamber, a drain provided in said control chamber for draining off an excess of fluid therefrom so as to modulate said fluid pressure for producing a reduced fluid pressure in said control chamber, a fluid pressure supply passage formed in said valve body communicating with said control chamber through said feedback passage, a flow restricting means provided in said fluid pressure supply passage, a control pressure delivery passage communicating with said feedback passage, a valve spool slidably received in said control chamber for controlling the degree of opening of said drain so as to vary the fluid pressure to be delivered to said control pressure delivery passage, a feedback piston slidably received in said feedback chamber and held in abutting engagement with said valve spool, and an electric actuator for controlling the movement of said valve spool, said actuator moving said valve spool in a position to close said drain so as to increase the fluid pressure in said control chamber whereby said feedback piston is responsive to the fluid pressure in said control chamber to cause said valve spool to move in another position to open said drain for varying the fluid pressure to be delivered to said control pressure delivery passage, and said electric actuator is energized in a varying degree in accordance with an electric current to correspondingly move said valve spool to different positions for controlling the degree of opening of said drain to regulate the level of the fluid pressure to be supplied to said feedback chamber for thereby varying the fluid pressure to be delivered to said control pressure delivery passage.

2. A hydraulic servo valve according to claim 1, wherein said electric actuator comprises a casing having formed therein a bore, a moving coil electrically connected to a source of electric power supply and operatively disposed in said bore, a diaphragm member mounted on said casing and operatively connected to said moving coil, a plunger connected to said diaphragm member and movable therewith, and a compression spring for biasing said plunger, said plunger being held in abutting engagement with said valve spool for moving said valve spool to close said drain, said casing being made of a magnetic material so as to cause said moving coil to move back and forth in said bore when said moving coil is energized.

3. A hydraulic servo valve according to claim 2, wherein said electric actuator further comprises an adjusting screw provided for adjusting the force of said compression spring so as to vary the force exerted to said plunger.

4. A hydraulic servo valve according to claim 1, wherein said feedback chamber includes an inlet communicating with said feedback passage, an outlet communicating with an exhaust passage, and flow restricting means respectively provided in said inlet and said outlet for decreasing the fluid pressure to be applied to said feedback piston.

5. A hydraulic servo valve according to claim 1, wherein said fluid pressure supply passage includes an additional flow restricting means, said control pressure delivery passage communicating with said fluid pressure supply passage at a point between said flow restricting means and said additional flow restricting means provided in said fluid pressure supply passage, whereby the fluid pressure to be delivered to said control pressure delivery passage is varied in accordance with the variations in said electric current and in the fluid pressure to be supplied to said fluid pressure supply passage.

6. A hydraulic servo valve for varying a fluid pressure comprising, in combination, a valve body, a control chamber formed in said valve body, a feedback chamber formed in said valve body, a feedback passage formed in said valve body and providing communication between said control chamber and said feedback chamber, a drain provided in said control chamber for training off an excess of fluid therefrom so as to modulate said fluid pressure for producing a reduced fluid pressure in said control chamber, a fluid pressure supply passage formed in said valve body and communicating with said control chamber through said feedback passage, a flow restricting means provided in said fluid pressure supply passage, a control pressure delivery passage communicating with said feedback passage, a valve spool slidably received in said control chamber and having first and second valve lands, said first valve land controlling the degree of opening of said drain so as to vary the fluid pressure to be delivered to said control pressure delivery passage, a feedback piston slidably received in said feedback chamber and held in abutting engagement with said second valve land, and an electric actuator for controlling the movement of said valve spool, whereby said actuator moves said valve spool in a position to close said drain to increase the fluid pressure in said control chamber, said feedback piston being responsive to the fluid pressure in said control chamber to cause said valve spool to move in another position to open said drain for thereby varying the fluid pressure to be delivered to said control pressure delivery passage, and said electric actuator being energized in a varying degree in accordance with an electric current to correspondingly move said valve spool to different positions for controlling the degree of opening of said drain to regulate the level of the fluid pressure to be supplied to said feedback chamber so as to varying the fluid pressure to be delivered to said control pressure delivery passage.

7. A hydraulic servo valve according to claim 6, wherein said electric actuator comprises a casing having formed therein a bore, a moving coil electrically connected to a source of electric power supply and operatively disposed in said bore, a diaphragm member mounted on said casing and operatively connected to said moving coil, a plunger connected to said diaphragm member and movable therewith, and a compression spring for biasing said plunger, and said plunger being held in abutting engagement with said first valve land of said valve spool for moving said valve spool to close said drain, and said casing being made of a magnetic material so as to cause said moving coil to move back and forth in said bore when said moving coil is energized.

8. A hydraulic servo valve according to claim 7, wherein said electric actuator further comprises an adjusting screw provided for adjusting the force of said compression spring so as to vary the force exerted to said plunger.

9. A hydraulic servo valve according to claim 6, wherein said feedback chamber includes an inlet communicating with said feedback passage, an outlet communicating with an exhaust passage, and flow restricting means respectively provided in said inlet and said outlet for decreasing the fluid pressure to be applied to said feedback piston.

10. A hydraulic servo valve according to claim 6, wherein said fluid pressure supply passage includes an additional flow restricting means, said control pressure delivery passage communicating with said fluid pressure supply passage at a point between said flow restricting means and said additional flow restricting means provided in said fluid pressure supply passage, whereby the fluid pressure to be delivered to said control pressure delivery passage is varied in accordance with the variations in said electric current and in the fluid pressure to be supplied to said fluid pressure supply passage.

* * * * *